United States Patent
Cvejanovic et al.

(10) Patent No.: US 11,436,180 B2
(45) Date of Patent: Sep. 6, 2022

(54) I3C SLAVE INTERFACE, INTEGRATED CIRCUIT INCLUDING AN I3C SLAVE INTERFACE, AND METHOD FOR OPERATING AN I3C SLAVE INTERFACE

(71) Applicant: Robert Bosch GmbH, Stuttgart (DE)

(72) Inventors: Dorde Cvejanovic, Munich (DE); Jan Hayek, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/043,049

(22) PCT Filed: Apr. 12, 2019

(86) PCT No.: PCT/EP2019/059580
§ 371 (c)(1),
(2) Date: Sep. 29, 2020

(87) PCT Pub. No.: WO2019/242906
PCT Pub. Date: Dec. 26, 2019

(65) Prior Publication Data
US 2021/0019279 A1    Jan. 21, 2021

(30) Foreign Application Priority Data
Jun. 21, 2018    (DE) ...................... 10 2018 210 061.6

(51) Int. Cl.
*G06F 13/42*    (2006.01)
*G06F 13/374*    (2006.01)
*G06F 13/40*    (2006.01)

(52) U.S. Cl.
CPC ........ *G06F 13/4282* (2013.01); *G06F 13/374* (2013.01); *G06F 13/4031* (2013.01); *G06F 13/4068* (2013.01)

(58) Field of Classification Search
CPC ............... G06F 13/4282; G06F 13/374; G06F 13/4031; G06F 13/4068
See application file for complete search history.

(56) References Cited

U.S. PATENT DOCUMENTS

| 8,943,254 B2* | 1/2015 | Tailliet ................ G06F 13/4295 710/306 |
| 10,860,513 B1* | 12/2020 | Cheung ............... G06F 13/4027 |
| 2009/0066381 A1* | 3/2009 | Anderson ............ H03K 17/166 327/170 |
| 2011/0072185 A1* | 3/2011 | Pinto ..................... G06F 3/0607 710/315 |
| 2014/0156893 A1 | 6/2014 | Monroe et al. |

(Continued)

FOREIGN PATENT DOCUMENTS

DE    102012222357 A1    6/2014

OTHER PUBLICATIONS

International Search Report for PCT/EP2019/059580, dated Jun. 19, 2019.

*Primary Examiner* — Phong H Dang
(74) *Attorney, Agent, or Firm* — Norton Rose Fulbright US LLP; Gerard Messina

(57) ABSTRACT

An interface for an I3C slave. The interface allows I3C slaves to also be connected to a conventional I2C bus that includes an I2C master. For this purpose, an additional adaptation device is provided that adapts the signals of the I2C bus for an I3C slave.

5 Claims, 1 Drawing Sheet

(56) References Cited

U.S. PATENT DOCUMENTS

| | | | |
|---|---|---|---|
| 2015/0186320 A1* | 7/2015 | Jaussi | G06F 13/4068 710/305 |
| 2015/0234773 A1* | 8/2015 | Sengoku | G06F 13/4221 710/106 |
| 2015/0234774 A1* | 8/2015 | Sengoku | G06F 13/4291 710/106 |
| 2015/0370735 A1* | 12/2015 | Pitigoi-Aron | G06F 13/4295 710/110 |
| 2016/0195910 A1* | 7/2016 | Sengoku | G06F 13/4027 710/313 |
| 2017/0286358 A1* | 10/2017 | Srivastava | G06F 1/324 |

* cited by examiner

I3C SLAVE INTERFACE, INTEGRATED CIRCUIT INCLUDING AN I3C SLAVE INTERFACE, AND METHOD FOR OPERATING AN I3C SLAVE INTERFACE

BACKGROUND INFORMATION

An inter-integrated circuit bus, for example, referred to as an I2C bus for short, is known as a data bus for communication between various circuit parts, for example between a controller and a peripheral device. This bus system is designed as a master-slave bus system.

German Patent Application No. DE 10 2012 222 357 A1 describes an I2C slave interface for which collisions between multiple devices at the bus are avoided when I2C slave components with different operating modes are operated.

A refinement of the I2C bus is the so-called improved inter-integrated circuit bus, referred to as I3C bus for short. The I3C bus is based on the I2C bus. I2C slaves may also be operated on an I3C bus that includes an I3C master. A mixed operation of I3C slaves and I2C slaves on an I3C bus that includes an I3C master is also possible. However, a connection of I3C slaves to an I2C bus that includes an I2C master is not provided.

SUMMARY

The present invention provides an improved inter-integrated circuit (I3C) slave interface, an integrated circuit, and a method for operating an I3C slave interface.

In accordance with an example embodiment of the present invention, the following is provided:

An I3C slave interface for coupling an I3C slave to an I3C bus or an I2C bus. The I3C slave interface includes an adaptation device. The adaptation device is designed to connect the I3C slave to an I2C bus.

Furthermore, in accordance with an example embodiment of the present invention, the following is provided:

An integrated circuit that includes an I3C slave interface according to the present invention.

The following is also provided in accordance with an example embodiment of the present invention:

A method for operating an I3C slave interface. The method includes a step for providing an adaptation device. The adaptation device is designed to connect an I3C slave to an I2C bus. In addition, the method includes a step for coupling the I3C slave to an I3C bus or an I2C bus, using the provided adaptation device.

The underlying finding of the present invention is that, although the operation of I2C slaves on an I3C bus is possible, conversely, the operation of I3C slaves on an I2C bus that includes an I2C master has not been provided thus far.

It is therefore a feature of the present invention to take this finding into account and provide an expansion for I3C slaves that allows an I3C slave interface to connect to an I2C bus. For this purpose, according to the present invention an additional adaptation device is provided in the I3C slave interface which allows a signal adaptation of the signals between the I2C bus and the I3C slave.

Such an adaptation device for adapting the signals of an I2C bus for an I3C slave may be implemented, for example, analogously to a corresponding circuit configuration for coupling an I2C slave to an I2C bus. In particular, such an adaptation device may include, for example, driver stages, filter elements, or also delay elements, as used, for example, for coupling an I2C slave to an I2C bus.

In this way, it is thus also possible to connect I3C slaves to an I2C bus. In particular, it is thus possible to operate novel I3C slaves on a conventional I2C bus. It is thus possible, for example, for modules that include an I3C interface to be integrated as I3C slaves on existing, conventional infrastructures that are operated with an I2C bus, in particular including an I2C master.

On the one hand, this also allows the use of recent I3C slaves on conventional, possibly older, systems that have been implemented based on an I2C bus, in particular with the aid of an I2C master. In addition, I2C bus systems, for example due to their lower data rate and their greater tolerances in the signal patterns according to the specifications, may also be operated as bus systems having a greater spatial extent. Due to the expansion according to the present invention of an I3C slave for an I2C bus system, for such cases it is also possible to use I3C slaves on a corresponding bus system.

According to one specific embodiment of the present invention, the adaptation device is bridgeable and/or deactivatable for the connection of an I3C slave to an I2C bus. Thus, the adaptation device need be integrated into the signal pattern between the I3C slave and the connected bus only if necessary. This allows, for example, the operation of an I3C slave on I2C bus systems and also on I3C bus systems.

According to one specific embodiment of the present invention, the adaptation device includes a number of one or multiple delay elements, glitch filters, and/or driver elements. These types of circuit elements, such as delay elements, glitch filters, or driver elements, are used in particular for connecting I2C slaves to an I2C bus. Thus, for example, delay elements still allow reliable operation and data exchange, in particular with the possibly high tolerances during operation on an I2C bus, in particular with a great spatial extent or other interferences. Glitch filters may be used, for example, for debouncing the transmitted signals or for similar purposes. Driver elements, in particular driver elements for the connections to an I2C bus, allow a sufficient signal amplification of the transmitted and/or received signals, in particular of the data signals and the clock signals on the I2C bus. In addition, of course any other circuit elements for adapting the signals between an I3C slave and an I2C bus are also possible.

According to one specific embodiment of the present invention, the I3C slave interface includes a control device. The control device may be designed to receive external signaling. This external signaling may represent, for example, signaling for the data bus to which the I3C slave interface is or is to be connected. The signaling may include, for example, a digital signal such as a digital voltage signal or the like. In particular, the signaling may be provided with the aid of a manual switch, for example. In addition, signalings from another connected device are also possible. In particular, the signaling may, for example, be provided once and subsequently stored in the signaling device. Such signaling thus corresponds, for example, to programming of the control device for future operation. In addition, it is also possible for the signaling to be continuously provided and adapted as desired at later points in time.

The control device may also be designed to bridge and/or deactivate the adaptation device as a function of the received external signaling. In this way, the operation of the I3C slave interface may be flexibly adapted to a data bus to be connected, in particular to an I2C bus or an I3C bus.

According to one specific embodiment of the present invention, the I3C slave interface includes a detector device. The detector device is designed to detect a connected I3C bus or a connected I2C bus. The detector device may also be designed to bridge or deactivate the adaptation device if a connected I3C bus has been detected. The detection of the connected bus may take place with the aid of any suitable methods. For example, the detector device may receive and analyze signals on a connected bus. For example, the type of connected bus may be identified with the aid of a detected clock rate, transmitted data, or the like. In addition, it is also possible for the detector device to identify the connected bus based on a communication with a master of the connected bus. In addition, of course any other methods for detecting the connected bus are also possible. In the case of a connected I2C bus, the adaptation device may be subsequently activated or looped into the signal pattern in order to adapt the signals between the I3C module and the connected I2C bus. If an I3C bus has been detected, the adaptation device may be bridged or at least deactivated, so that the signals between the I3C module of the slave and the connected I3C bus are not further modified.

The above embodiments and refinements may be arbitrarily combined with one another if this is meaningful. Further embodiments, refinements, and implementations of the present invention, even if not explicitly stated, also include combinations of features of the present invention that are described with regard to the exemplary embodiments above or in the description below. In particular, those skilled in the art will also add individual aspects as enhancements or supplements to the particular basic forms of the present invention, based on the present disclosure.

BRIEF DESCRIPTION OF THE DRAWINGS

The present invention is explained in greater detail below with reference to the exemplary embodiments shown in the schematic figures.

DETAILED DESCRIPTION OF EXAMPLE EMBODIMENTS

Figure 1:
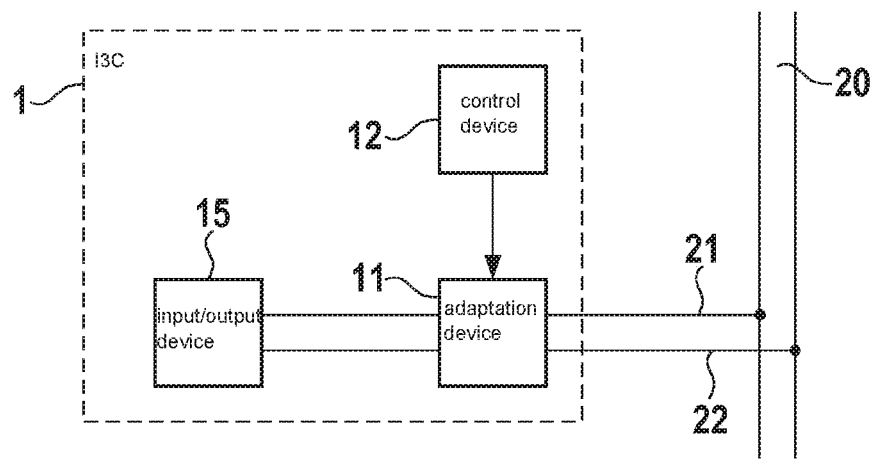
FIG. 1 shows a schematic illustration of a block diagram of an I3C slave that includes a slave interface according to one specific embodiment of the present invention.

FIG. 1 shows a schematic illustration of a block diagram of an I3C slave 1 according to one specific embodiment. I3C slave 1 may be connected to an I3C bus or I2C bus 20. The data bus, in particular the I2C bus, may include two signal lines 21, 22. One of the two signal lines 21 may be utilized, for example, as a clock line (serial clock line (SCL)), and the other line 22 may be used as a data line (serial data line (SDA)).

Lines 21, 22 of I2C bus 20 may be coupled to an adaptation device 11. Adaptation device 11 connects lines 21, 22 of I2C bus 20 to an internal input/output device 15 of I3C slave 1. Internal input/output device 15 is designed to receive and emit signals in an I3C-compliant format. If I3C slave 1 is connected to an I3C bus that includes an I3C master, the signals may thus be directly exchanged between internal input/output device 15 and I3C bus without further modification. In this case, adaptation device 11 may be bridged or deactivated, for example.

However, if I3C slave 1 is connected to an I2C bus 20, adaptation device 11 carries out an adaptation of the signals between I2C bus 20 and internal input/output device 15.

For example, the signal levels may be adapted with the aid of suitable driver elements (not illustrated) in adaptation device 11. It is thus possible to adapt the voltage and/or the power provided at I2C bus 20 if necessary. In addition, debouncing of the signals from I2C bus 20 may take place, for example, with the aid of so-called glitch filters or other suitable circuit elements. Furthermore, it is also possible to delay the rise or fall of an edge in a signal pattern on one or both signal lines 21, 22 with the aid of delay elements in adaptation device 11. For example, the synchronization of the signal patterns may be adapted in this way. In addition, any other suitable circuit elements for adapting the signals between the internal signal patterns according to the I3C standard and the signal patterns on the external I2C bus are also possible.

It is thus possible, with the aid of adaptation device 11, for an I3C slave 1 to also be connected to an external I2C bus 20 with the aid of additional adaptation device 11.

To also allow preferably flexible use of I3C slave 1, adaptation device 11 may also be bridged and/or deactivated if necessary. In this way, I3C slave 1 may also be connected to an I3C bus.

For this purpose, for example a control device 12 may be provided that bridges or at least deactivates adaptation device 11 if necessary. For this purpose, external signaling, for example, may be provided at control device 12. Control device 12 may subsequently activate or deactivate adaptation device 11 or also completely bridge adaptation device 11 as a function of the external signaling. In this regard, signaling may be understood to mean, for example, the application of a predefined voltage to control device 12. For example, for this purpose a mechanical switching element may be switched back and forth between two switching states in order to provide appropriate signaling at control device 12. Alternatively, appropriate signaling at control device 12 may also be provided by some other electronic switching element.

For example, control device 12 may store signaling that is provided once, and may subsequently permanently activate or deactivate or bridge adaptation device 11. Alternatively, it is also possible for the operation of activation or deactivation or bridging of adaptation device 11 to take place reversibly. In this case, control device 12 may continuously query the external signaling and correspondingly activate or deactivate or bridge adaptation device 11.

Figure 2:
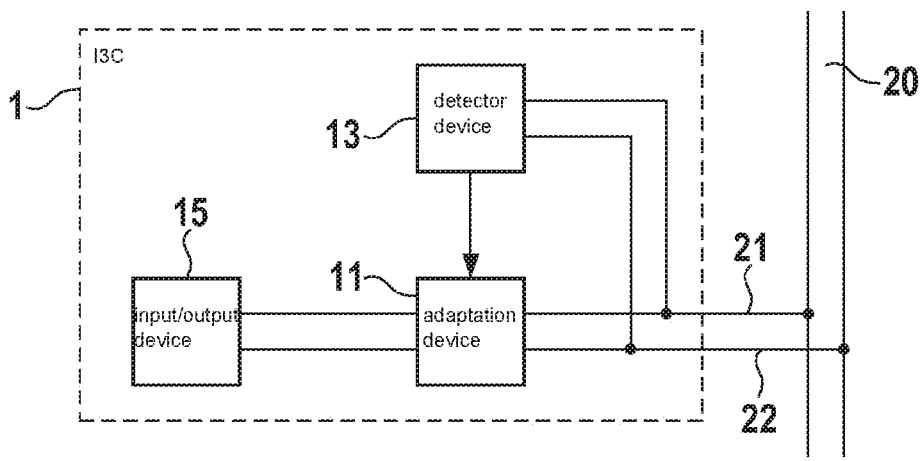
FIG. 2 shows a schematic illustration of a block diagram of an I3C slave that includes a slave interface according to another specific embodiment of the present invention.

FIG. 2 shows a schematic illustration of a block diagram of an I3C slave 1 according to a further specific embodiment. I3C slave 1 according to the specific embodiment in FIG. 2 largely corresponds to the specific embodiment described above, so that a repetition of the discussion in question has been omitted here.

I3C slave 1 according to FIG. 2 differs from the specific embodiment described above solely in that instead of control device 12, a detector device 13 is provided which automatically detects a connected I2C bus 20. In particular, detector device 13 may distinguish between a connected I3C bus and a connected I2C bus 20. If an I2C bus has been detected, adaptation device 11 is activated or looped into the signal flow between internal input/output device 15 and I2C bus 20. Alternatively, if an I3C bus has been detected, adaptation device 11 is deactivated or bridged.

The detection of the connected bus may take place with the aid of any suitable methods. For example, detector device 13 may analyze the signal patterns on at least one of lines 21, 22 of the bus in order to deduce the particular connected I3C bus or I2C bus. However, any other methods for detecting the particular connected bus are also possible.

Figure 3:
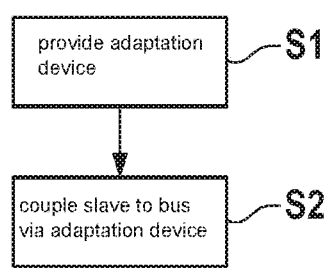
FIG. 3 shows a schematic illustration of a flow chart which is the basis of a method for operating an I3C slave interface according to one specific embodiment of the present invention.

FIG. 3 shows a schematic illustration of a flow chart which is the basis of a method for operating an I3C slave interface according to one specific embodiment.

An adaptation device 11 is initially provided in step S1. This adaptation device 11 is designed to connect an I3C slave 1 to an I2C bus. I3C slave 1 is coupled to a bus via provided adaptation device 11 in step S2. I3C slave 1 may be connected either to an I3C bus or an I2C bus.

In particular, adaptation device 11 may be bridged or deactivated if I3C slave 1 has been coupled to an I3C bus.

Correspondingly, adaptation device 11 may be activated or looped into the signal path if I3C slave 1 has been coupled to an I2C bus 20.

In summary, the present invention relates to an interface for an I3C slave. The interface according to the present invention allows I3C slaves to also be connected to a conventional I2C bus that includes an I2C master. For this purpose, an additional adaptation device is provided which adapts the signals of the I2C bus for an I3C slave.

What is claimed is:

1. An improved inter-integrated circuit (I3C) slave interface for coupling an I3C slave to an I3C bus or to an inter-integrated circuit I2C bus, comprising:
   an adaptation device configured to connect the I3C slave to the I2C bus;
   a control device to receive external signaling and to bridge or deactivate the adaptation device as a function of the received external signaling; and
   a detector device to detect a connected I3C bus and a connected I2C bus, and to bridge or deactivate the adaptation device if the connected I3C bus has been detected;
   wherein the adaptation device connects lines of the I2C bus to an internal input/output device of the I3C slave,
   wherein the internal input/output device is configured to receive and emit signals in an I3C-compliant format,
   wherein when the I3C slave is connected to the I3C bus and the I3C bus includes an I3C master, the signals are directly exchangeable between the internal input/output device and the I3C bus without further modification, so that the adaptation device is bridgeable or deactivatable,
   wherein the external signaling includes signaling for the I3C bus or the inter-integrated circuit I2C bus to which the I3C slave interface is or is to be connected, wherein the signaling is provided by a signaling device, and wherein the signaling is provided once and subsequently stored in the signaling device,
   wherein the control device stores signaling that is provided once, and subsequently permanently activate or deactivate or bridge the adaptation device, or wherein operation of the activation or the deactivation or the bridging of the adaptation device takes place reversibly, in which case the control device continuously queries the external signaling and correspondingly activates or deactivates or bridges the adaptation device,
   wherein if an I2C bus has been detected, the adaptation device is activated or looped into a signal flow between the internal input/output device and the I2C bus, and
   wherein if an I3C bus has been detected, the adaptation device is deactivated or bridged.

2. The I3C slave interface as recited in claim 1, wherein the adaptation device includes at least one of:
   a delay element to delay a rise or a fall of an edge in a signal pattern on one or two signal lines, and/or
   a glitch filter for debouncing of the signals from the I2C bus,
   a driver element to adapt a voltage and/or a power provided at the I2C bus.

3. An integrated circuit, comprising:
   an improved inter-integrated (I3C) slave interface for coupling an I3C slave to an I3C bus or to an inter-integrated circuit I2C bus, the I3C slave interface including an adaptation device to connect the I3C slave to the I2C bus;
   a control device to receive external signaling and to bridge or deactivate the adaptation device as a function of the received external signaling; and
   a detector device to detect a connected I3C bus and a connected I2C bus, and to bridge or deactivate the adaptation device if the connected I3C bus has been detected;
   wherein the adaptation device connects lines of the I2C bus to an internal input/output device of the I3C slave,
   wherein the internal input/output device is configured to receive and emit signals in an I3C-compliant format,
   wherein when the I3C slave is connected to the I3C bus and the I3C bus includes an I3C master, the signals are directly exchangeable between the internal input/output device and the I3C bus without further modification, so that the adaptation device is bridgeable or deactivatable,
   wherein the external signaling includes signaling for the I3C bus or the inter-integrated circuit I2C bus to which the I3C slave interface is or is to be connected, wherein the signaling is provided by a signaling device, and wherein the signaling is provided once and subsequently stored in the signaling device, and
   wherein the control device stores signaling that is provided once, and subsequently permanently activate or deactivate or bridge the adaptation device, or wherein operation of the activation or the deactivation or the bridging of the adaptation device takes place reversibly, in which case the control device continuously queries the external signaling and correspondingly activates or deactivates or bridges the adaptation device,
   wherein if an I2C bus has been detected, the adaptation device is activated or looped into a signal flow between the internal input/output device and the I2C bus, and
   wherein if an I3C bus has been detected, the adaptation device is deactivated or bridged.

4. A method for operating an improved inter-integrated circuit (I3C) slave interface, the method comprising:
   providing an adaptation device to connect an I3C slave to an inter-integrated circuit I2C bus; and
   coupling, using the adaptation device, the I3C slave to an I3C bus or an I2C bus;
   receiving external signaling and to bridge or deactivate, via a control device, the adaptation device as a function of the received external; and
   detecting, via a detector device, a connected I3C bus and a connected I2C bus, and to bridge or deactivate the adaptation device if the connected I3C bus has been detected;
   wherein the adaptation device connects lines of the I2C bus to an internal input/output device of the I3C slave,
   wherein the internal input/output device is configured to receive and emit signals in an I3C-compliant format, wherein when the I3C slave is connected to the I3C bus and the I3C bus includes an I3C master, the signals are directly exchangeable between the internal input/output device and the I3C bus without further modification, so that the adaptation device is bridgeable or deactivatable, wherein the external signaling includes signaling for the I3C bus or the inter-integrated circuit I2C bus to which the I3C slave interface is or is to be connected, wherein the signaling is provided by a signaling device, and wherein the signaling is provided once and subsequently stored in the signaling device, and wherein the control device stores signaling that is provided once, and subsequently permanently activate or deactivate or bridge the adaptation device, or wherein operation of the activation or the deactivation or the bridging of the adaptation device takes place reversibly, in which case the control device continuously queries the external signaling and correspondingly activates or deactivates or bridges the adaptation device, wherein if an I2C bus has been detected, the adaptation device is activated or looped into a signal flow between the internal input/output device and the I2C bus, and wherein if an I3C bus has been detected, the adaptation device is deactivated or bridged.

5. The method as recited in claim 4, wherein the adaptation device is bridged or deactivated when the I3C slave is coupled to the I3C bus, so that the signals between an I3C module of the slave and the connected I3C bus are not further modified.

* * * * *